(12) United States Patent
Salamanca

(10) Patent No.: US 7,567,855 B2
(45) Date of Patent: Jul. 28, 2009

(54) ROBOT SYSTEM AND METHOD FOR BALL LOADING FOR LOADING INTO SAG AND/OR BALL MILLS IN ORE CONCENTRATION PROCESSES

(76) Inventor: Hugo Salamanca, Av. Suecia 84, Oficina 43, Providencia, Santiago, RM (CL)

( * ) Notice: Subject to any disclaimer, the term of this patent is extended or adjusted under 35 U.S.C. 154(b) by 117 days.

(21) Appl. No.: 11/595,959

(22) Filed: Nov. 13, 2006

(65) Prior Publication Data
US 2007/0149098 A1 Jun. 28, 2007

Related U.S. Application Data

(60) Provisional application No. 60/734,989, filed on Nov. 10, 2005.

(51) Int. Cl.
*G06F 19/00* (2006.01)
(52) U.S. Cl. .................. 700/245; 700/247; 700/258; 700/259; 700/246; 700/248; 318/568.11; 901/1; 901/2; 901/46; 901/47; 348/114; 348/118
(58) Field of Classification Search ............... 700/245, 700/247, 258, 259; 318/568.11; 901/2; 414/729, 414/737; 451/57
See application file for complete search history.

(56) References Cited

U.S. PATENT DOCUMENTS

| 6,678,583 | B2* | 1/2004 | Nasr et al. ................ 700/245 |
| 6,859,683 | B2* | 2/2005 | Parker et al. .............. 700/259 |
| 2004/0023495 | A1* | 2/2004 | Butterfield et al. .......... 438/692 |
| 2006/0151336 | A1* | 7/2006 | Butterfield et al. .......... 205/652 |
| 2006/0231414 | A1* | 10/2006 | Butterfield et al. .......... 205/662 |
| 2007/0144005 | A1* | 6/2007 | Salamanca ............. 29/890.124 |
| 2007/0144006 | A1* | 6/2007 | Salamanca ............. 29/890.124 |
| 2007/0145649 | A1* | 6/2007 | Salamanca .................. 266/78 |
| 2007/0145650 | A1* | 6/2007 | Salamanca .................. 266/79 |
| 2007/0147961 | A1* | 6/2007 | Salamanca ................. 405/232 |
| 2007/0151580 | A1* | 7/2007 | Salamanca ................... 134/18 |
| 2007/0152616 | A1* | 7/2007 | Salamanca ............. 318/568.11 |
| 2007/0153260 | A1* | 7/2007 | Salamanca .............. 356/237.1 |
| 2007/0169230 | A1* | 7/2007 | Salamanca .................... 901/2 |
| 2007/0185610 | A1* | 8/2007 | Salamanca ................. 700/197 |
| 2007/0267043 | A1* | 11/2007 | Salamanca .................... 134/6 |

OTHER PUBLICATIONS

Metso minerals, Autogenous/Semi-Autogenous Mills, 2002, Internet, p. 1-2.*
Metso minerals, Metso Capital Markets Day, 2004, Internet, p. 1-31.*

(Continued)

*Primary Examiner*—Khoi Tran
*Assistant Examiner*—Marc McDieunel
(74) *Attorney, Agent, or Firm*—Gottlieb Rackman & Reisman PC

(57) ABSTRACT

A robot system and method have been developed which are able to automatically load balls in semi-autogenous grinding mills so as to reduce the time used for maintenance. The robotic system is comprised of a robotic manipulator of at least 5 degrees of freedom, a grip mechanism which allows, in a sequential and programmed way, to take, manipulate and release a ball from a ball holder rack located at one of its sides.

11 Claims, 2 Drawing Sheets

OTHER PUBLICATIONS

Figure 1:
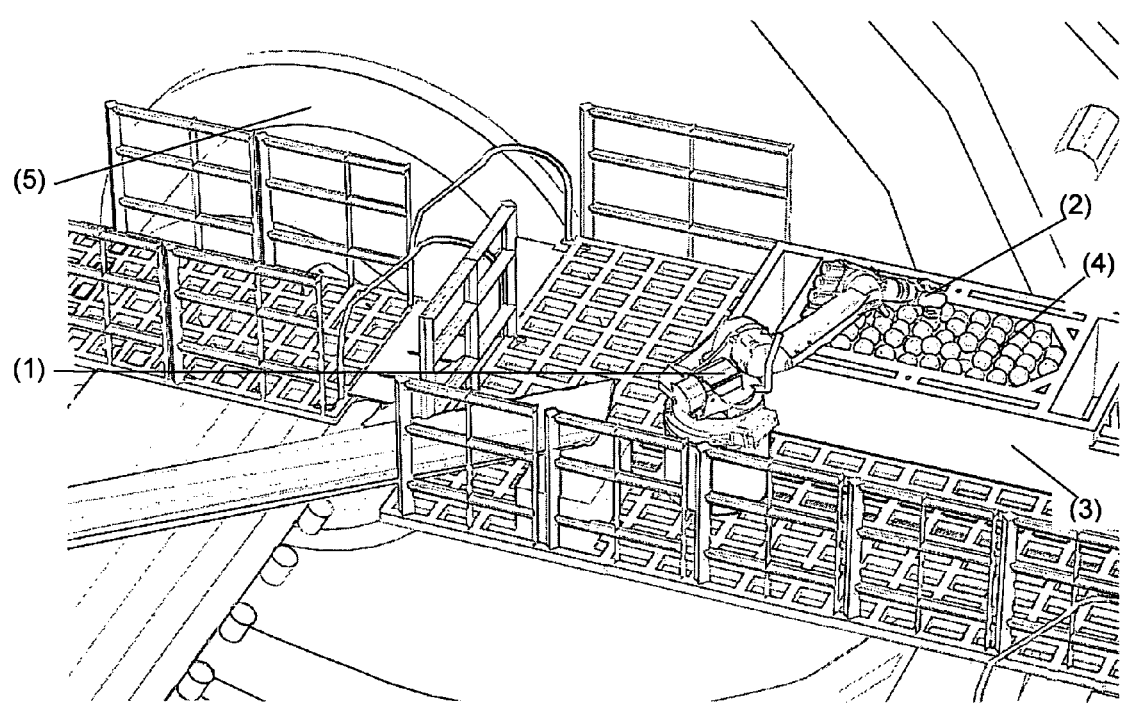

CSIRO, QCAT Annual Report—Queensland Center for Advanced Technologies, 2003, Internet, p. 1-32.*
Greer, Selection Criteria for Sag Mill Drive Systems, 1990, IEEE, p. 901-908.*
Spencer et al., Acoustic Emissions Monitoring of☐☐Sag Mill Performance, 1999, IEEE, p. 939-946.*
Sheble, ISA_Mining's new age, 2001, Internet, p. 1-4.*
CSIRO, QCAT Annual Report—Queensland Center for Advanced Technologies, 2005, Internet, p. 1-36.*
Agnico-Eagle Mines Ltd., Variable Speed Control of SAG Mill in the Mining Industry, 2004, MInternet, p. 1-2.*
Metso minerals, Metso Ball Mills, 2002, Internet, p. 1-2.*
Pontt et al., Current Issues on High-Power Cycloconverter—fed Gearless Motor Drives for Grinding Mills, 2003, IEEE, p. 369-374.*
Metso minerals, Minerals Processing Equipment, 2007, Internet, p. 1-16.*

* cited by examiner

ROBOT SYSTEM AND METHOD FOR BALL LOADING FOR LOADING INTO SAG AND/OR BALL MILLS IN ORE CONCENTRATION PROCESSES

CROSS-REFERENCE TO RELATED APPLICATIONS

This application claims the benefit of provisional patent application Ser. No. 60/734,989 filed 2005 Nov. 10 by the present inventor

FEDERAL SPONSORED RESEARCH

Not Applicable

SEQUENCE LISTING OR PROGRAM

Not Applicable

BACKGROUND OF THE INVENTION

1. Field of Invention

This invention relates to the use of robotic technology in mining industry, specifically in the concentrator area.

2. Prior Art

Once the mineral is extracted from the mine, it should be subjected to a treatment to increase its purity. This metallurgical treatment is called concentration, which is carried out in a concentrating plant usually located near the production unit of the mine. This plant concentrates the minerals, until their metal content reaches commercial values. The stages of this process are crushing and milling (the progressive reduction of particles until reaching sizes lower than one millimeter), followed by the flotation process using chemical reagents, where the valuable mineral (copper and molybdenum concentrates) is separated from the gangue (which is the worthless material, called tailing).

In the milling stage, special reactors called grinding mills are used in which the mineral comminution process is carried out (the process in which the particle is broken to a smaller size). This process is carried out by combining impact and abrasion under dry conditions or in a water suspension.

As part of the normal operation process of semi-autogenous grinding (SAG) mills, the grinding balls should be loaded into the reactor. However, the automatic dosing unit clogs on a continuous basis and the reactor must be loaded manually. Similarly, the low storage capacity requires the continuous use of a crane.

From the economic point of view, one of the major disadvantages which the current method used for ball loading is the long time this operation takes, which generates a loss in the equipment productivity due to the fact that production is reduced because of mill stoppage.

Another disadvantage of the current method for ball loading is safety. Sometimes the personnel is required to go inside the equipment, which is usually a risky action, mainly due to the fact that some elements which are trapped between the liners fall down.

Due to the above, a robot system and method have been developed which allow to carry out an automated ball loading process into the SAG mills, so as to diminish the time spent for ball loading and to reduce risk of accidents in the personnel.

SUMMARY

A robot system with a pneumatic gripping mechanism which allows the loading of grinding balls from a ball holder rack to the SAG mill.

DRAWINGS—FIGURES

In the drawings, closely related figures share the same numbers, with different alphabetic suffixes.

FIG. 1. View of the robotic manipulator loading a ball into a SAG and/or ball mill.

Figure 2:
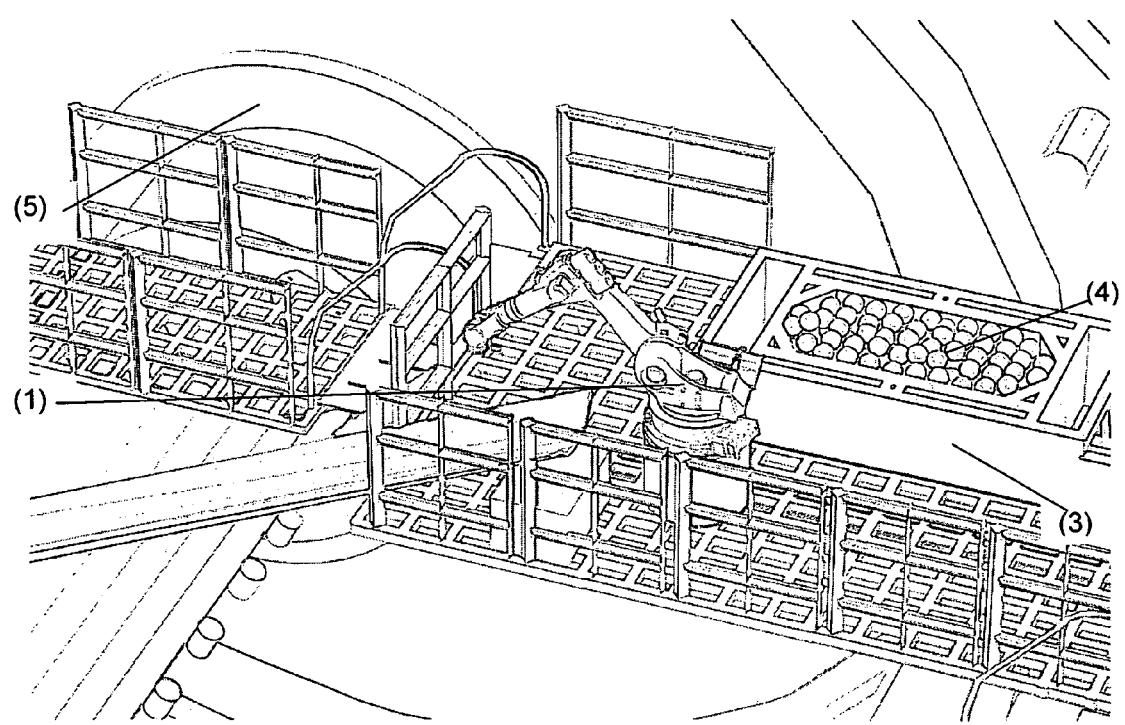

FIG. 2. General view of a robot system for loading balls into a SAG and/or ball mill in ore concentration processes.

DRAWINGS—REFERENCE NUMERALS

1. Robotic manipulator
2. Gripping mechanism
3. Ball holder rack
4. Grinding balls
5. SAG mill

DETAILED DESCRIPTION

This invention relates to a new robot system as well as a robotic method for grinding ball loading procedures into SAG and/or ball mills, which are carried out automatically through anthropomorphous robotic arms of at least 5 degrees of freedom, which are installed at one side of the SAG mill. With reference to FIG. 1 and FIG. 2, the robot system is composed mainly of one robotic manipulator (1) of at least 5 degrees of freedom, provided with a communication, acquisition and control system, and a grip mechanism (2) to allow, in a sequential and programmed way, to take, manipulate, and release, from a ball holder rack (3) located at one of its sides, a number of grinding balls to be defined (4), which are moved through a defined path until reaching the inside of the SAG mill (5) in which they are deposited.

I claim:

1. A robot system for ball loading into semi-autogenous grinding and/or ball mills in ore concentration processes comprising
    an anthropomorphous robotic arm of at least 5 degrees of freedom,
    a control, communication and programming unit,
    a gripper adapter,
    a pneumatic gripper with fingers,
    a pneumatic gripper driving system, and
    an electric supply system and a slide-type ball loading system;
    said pneumatic gripper allows the sequential and programmed taking, manipulation and release of a grinding ball from a ball holder rack located at one of side of the semi-autogenous grinding mills;
    said anthropomorphous robotic arm moves said ball through a defined path to said loading system, in which said ball is deposited in the inner part of the semi-autogenous grinding mill; and
    said anthropomorphous robotic arm includes an electrical system driven by three-stage induction motors with vectorial and/or scalar control.

2. The robot system according to claim 1, wherein said robotic arm includes the capability to take, manipulate and release one or more grinding balls from said ball holder rack and to move a ball within the work volume of said robot system.

3. The robot system according to claim 1, wherein said robotic arm deposits a ball into said loading system to subsequently be deposited inside the semi-autogenous grinding and/or ball mill.

4. The robot system according to claim 1, wherein said anthropomorphous robotic arm communicates alone or through a program logic controller interface with the control system.

5. The robot system according to claim 1, wherein said anthropomorphous robotic arm for obtaining and interpreting information from installed analogue and/or digital sensors.

6. The robot system according to claim 1, wherein said anthropomorphous robotic arm is capable of generating analogue and/or digital signals to control analogue and/or digital input devices.

7. The robot system according to claim 1, wherein said pneumatic gripper takes, manipulates and releases grinding balls from said ball holder rack.

8. The robot system according to claim 1, wherein said robotic arm is mounted on a fixed and/or mobile support located between said semi-autogenous grinding mill and said ball holder rack.

9. The robot system according to claim 1, productivity and efficiency of ball loading processes into semi-autogenous grinding mills increase and the equipment operation time decreases.

10. The robot system according to claim 1, the system may operate automatically or semi automatically.

11. The robot system according to claim 1, wherein said robot system is used for ball loading, either individually or in collaboration, in a wide range of other industrial productive processes.

* * * * *